US012578940B2

(12) United States Patent
Weber et al.

(10) Patent No.: US 12,578,940 B2
(45) Date of Patent: Mar. 17, 2026

(54) PREPROCESSING CODE USING LARGE LANGUAGE MODELS FOR PERFORMANCE PORTABILITY

(71) Applicant: NEC Laboratories Europe GmbH, Heidelberg (DE)

(72) Inventors: Nicolas Weber, Heidelberg (DE); Roberto Bifulco, Heidelberg (DE); Marc Betzwieser, Heidelberg (DE); Yves Ekspenszid, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 196 days.

(21) Appl. No.: 18/512,215

(22) Filed: Nov. 17, 2023

(65) Prior Publication Data

US 2025/0094145 A1     Mar. 20, 2025

Related U.S. Application Data

(60) Provisional application No. 63/538,330, filed on Sep. 14, 2023.

(51) Int. Cl.
*G06F 9/44*       (2018.01)
*G06F 8/41*       (2018.01)

(52) U.S. Cl.
CPC ...................................... *G06F 8/43* (2013.01)

(58) Field of Classification Search
CPC ........................................................ G06F 8/43
See application file for complete search history.

(56) References Cited

U.S. PATENT DOCUMENTS 11,693,637 B1 * 7/2023 Singh ...................... G06F 8/436
                                                                717/139
11,847,436 B2 * 12/2023 Strenski .................... G06F 8/41
                                   (Continued)

FOREIGN PATENT DOCUMENTS

DE        102022109136 A1      7/2023
WO    WO 2023/072386 A1      5/2023

OTHER PUBLICATIONS

Ahmed, Hadia M. R. M.; "Improving Performance Portability and Productivity of Parallel Scientific Applications for Exascale"; *Computer and Information Sciences—Doctor of Philosophy—The University of Alabama at Birmingham*; Dec. 1, 2017; pp. 1-24; Art. No. 10616777; ProQuest Dissertations Publishing; Ann Arbor, MI, USA.

(Continued)

*Primary Examiner* — Qamrun Nahar
(74) *Attorney, Agent, or Firm* — Leydig, Voit & Mayer, Ltd.

(57)         ABSTRACT
A computer-implemented, machine learning method for preprocessing code for performance portability includes extracting performance critical code segments from an application and obtaining input data. Ground truth data is generated based on the input data and the application. Original code of the application is transpiled using a large language model (LLM) into a tensor computation language (TCL) candidate. Correctness of an implementation of the TCL candidate is verified using the ground truth data. The method has applications including, but not limited to, use cases in medical/healthcare, and other artificial intelligence applications for preprocessing and optimizing code for performance portability. The method can also support decision making and could be implemented with machine learning.

20 Claims, 5 Drawing Sheets

(56)                    References Cited

U.S. PATENT DOCUMENTS

| | | |
|---|---|---|
| 2022/0236971 A1 | 7/2022 | Zhang et al. |
| 2022/0308848 A1 | 9/2022 | Clement et al. |
| 2022/0413820 A1 | 12/2022 | Lewis et al. |
| 2023/0018088 A1 | 1/2023 | Singh et al. |
| 2023/0188316 A1* | 6/2023 | Springer, IV ........... H04L 9/008 380/28 |
| 2024/0385814 A1* | 11/2024 | Fu ............................. G06F 8/35 |

OTHER PUBLICATIONS

Ahmed, Hadia et al.; "Transforming Blocking MPI Collectives to Non-blocking and Persistent Operations"; *Proceedings of the 24th European MPI Users' Group Meeting*; Sep. 25, 2017; pp. 1-11; Art. No. 3; ACM Publications; New York, NY, USA.

Bysiek, Mateusz et al.; "Migrating legacy Fortran to Python while retaining Fortran-level performance through transpilation and type hints"; *Proceedings of the 6th Workshop on Python for High-Performance and Scientific Computing*; Nov. 13, 2016; pp. 9-18 (Presentation); ACM Publications; New York, NY, USA.

Cui, Siwei et al.; "PYInfer: Deep Learning Semantic Type Inference for Python Variables"; *Software Engineering*; Jun. 27, 2021; pp. 1-12; vol. 1; ArXiv.org, Cornell University; Ithaca, NY, USA.

Feldt, Robert et al.; "Towards Automated Boundary Value Testing with Program Derivatives and Search"; *Search-Based Software Engineering: 11th International Symposium*; Aug. 31, 2019; pp. 155-163; ACM Publications; New York, NY, USA.

Garg, Spandan et al.; "DeepPERF: A Deep Learning-Based Approach For Improving Software Performance"; *ESEC/FSE '22: 30th ACM Joint European Software Engineering Conference and Symposium on the Foundations of Software Engineering*; Jun. 27, 2022; pp. 1-12; vol. 1; ArXiv.org, Cornell University; Ithaca, NY, USA.

Jana, Prithwish et al.; "Attention, Compilation, and Solver-based Symbolic Analysis are All You Need"; *Computer Science—Programming Languages*; Jun. 11, 2023; pp. 1-11; vol. 1; ArXiv. org, Cornell University; Ithaca, NY, USA.

Kumar, Ankit; "Source to Source Compiler"; *Gate CS—Compiler Design*; Nov. 1, 2022; pp. 1-10; GeeksforGeeks; Noida, Uttar Pradesh, India.

Lachaux, Marie-Anne et al.; "Unsupervised Translation of Programming Languages"; *Proceedings of the 34th International Conference on Neural Information Processing Systems*; Sep. 22, 2020; pp. 20601-20611; vol. 3, Art. No. 1730; ArXiv.org, Cornell University; Ithaca, NY, USA.

Laukemann, Jan; "Cross-Architecture Automatic Critical Path Detection For In-Core Performance Analysis"; *Master Thesis—Professur für Höchstleistungsrechnen—Department Informatik*; Jan. 31, 2020; pp. 1-65; Friedrich-Alexander-Universität (FAU) Erlangen-Nürnberg; Erlangen, Germany.

Madaan, Aman et al.; "Learning Performance-Improving Code Edits"; *International Conference on Learning Representations*; Feb. 21, 2023; pp. 1-26; vol. 3; ArXiv.org, Cornell University; Ithaca, NY, USA.

Paduraru, Ciprian et al.; "An Automatic Test Data Generation Tool using Machine Learning"; *Proceedings of the 13th International Conference on Software Technologies*; Nov. 21, 2018; pp. 472-481; SCITEPRESS—Science and Technology Publications; Setúbal, Portugal.

Pan, Rangeet et al.; "Understanding the Effectiveness of Large Language Models in Code Translation"; *International Conference on Software Engineering*; Aug. 6, 2023; pp. 1-14; vol. 1; ArXiv.org, Cornell University; Ithaca, NY, USA.

Wang, Bo et al.; "User-Customizable Transpilation for Scripting Languages"; *Proceedings of the ACM on Programming Languages*; Mar. 6, 2023; pp. 201-229; vol. 7, No. OOPSLA1; Article No. 82; ArXiv.org, Cornell University; Ithaca, NY, USA.

* cited by examiner

100

102

Program Code

104

LLM

106

Transpiled /
Optimized Code

200 performance critical code segments

206 store ground truth

214 extract performance critical code segments

204 infer suitable input data

210 generate ground truth

212 program code

202 provide input data

208

PREPROCESSING CODE USING LARGE LANGUAGE MODELS FOR PERFORMANCE PORTABILITY

CROSS-REFERENCE TO PRIOR APPLICATION

Priority is claimed to U.S. Provisional Application Ser. No. 63/538,330 filed on Sep. 14, 2023, the entire contents of which is hereby incorporated by reference herein.

FIELD

The present invention relates to Artificial Intelligence (AI) and machine learning (ML), and in particular to a method, system, data structure, computer program product and computer-readable medium for preprocessing code for performance portability.

BACKGROUND

Over the last decades, computer programming of scientific applications has undergone several technical revolutions. Different processor architectures (CPUs, GPUs, Vector Processors, FPGAs, . . . ), programming extensions (SSE, AVX, AVX512, Arm NEON, . . . ) and programming application processing interfaces (APIs) (CUDA, VEDA, HIP, OneAPI, OpenCL, SyCL, MPI, VHDL, Verilog, . . . ) allow to write very efficient programs that run at peak performance on the specific hardware. However, due to the vast variety of hardware platforms and programming options, a huge technology development effort is required for the software, and it is also required to maintain different implementations in parallel, or to do complete rewrites when switching to another hardware platform.

Due to the very large legacy code bases still in use today, vendors that provide compilers for old programming languages such as Fortran have a huge competitive advantage because they allow users to run their old code on modern hardware, even if the hardware itself is inferior to the competition, which does not support to run these older program codes. However, often these compilers require vendor specific code annotations (pragmas) that need to be fine-tuned for the specific hardware.

The huge impact of AI frameworks such as PyTorch and TensorFlow, has changed the situation somewhat. These AI frameworks provide a very high level mathematical driven tensor computation language (TCL), that can be used to mathematically describe the problem and then let the framework decide on which hardware to run and how to distribute among different computation nodes. The user doesn't see which APIs, libraries or mechanisms are used underneath. A single code base allows to scale the same code from a single notebook up to an entire cluster or cloud.

These are two extremes: the legacy code written in a very hardware agnostic manner in old languages, and the new, modern TCL-driven programming models. Although the TCLs allow to quickly write code, there are still technical difficulties associated with the very large legacy code bases, which were often written decades ago by people often no longer working for the respective university or company. Porting these codes to the TCLs is a very technically challenging, lengthy, resource intensive and error prone task, especially if the old code uses specific hardware tricks (e.g., integer over-/underflow or special floating point rounding properties) that cannot be modelled in the TCLs.

SUMMARY

In an embodiment, the present invention provides a computer-implemented, machine learning method for preprocessing code for performance portability. Performance critical code segments are extracted from an application, and input data is obtained. Ground truth data is generated based on the input data and the application. Original code of the application is transpiled using a large language model (LLM) into a tensor computation language (TCL) candidate. Correctness of an implementation of the TCL candidate is verified using the ground truth data. The method has applications including, but not limited to, use cases in medicine/healthcare, and other artificial intelligence applications for preprocessing and optimizing code for performance portability.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
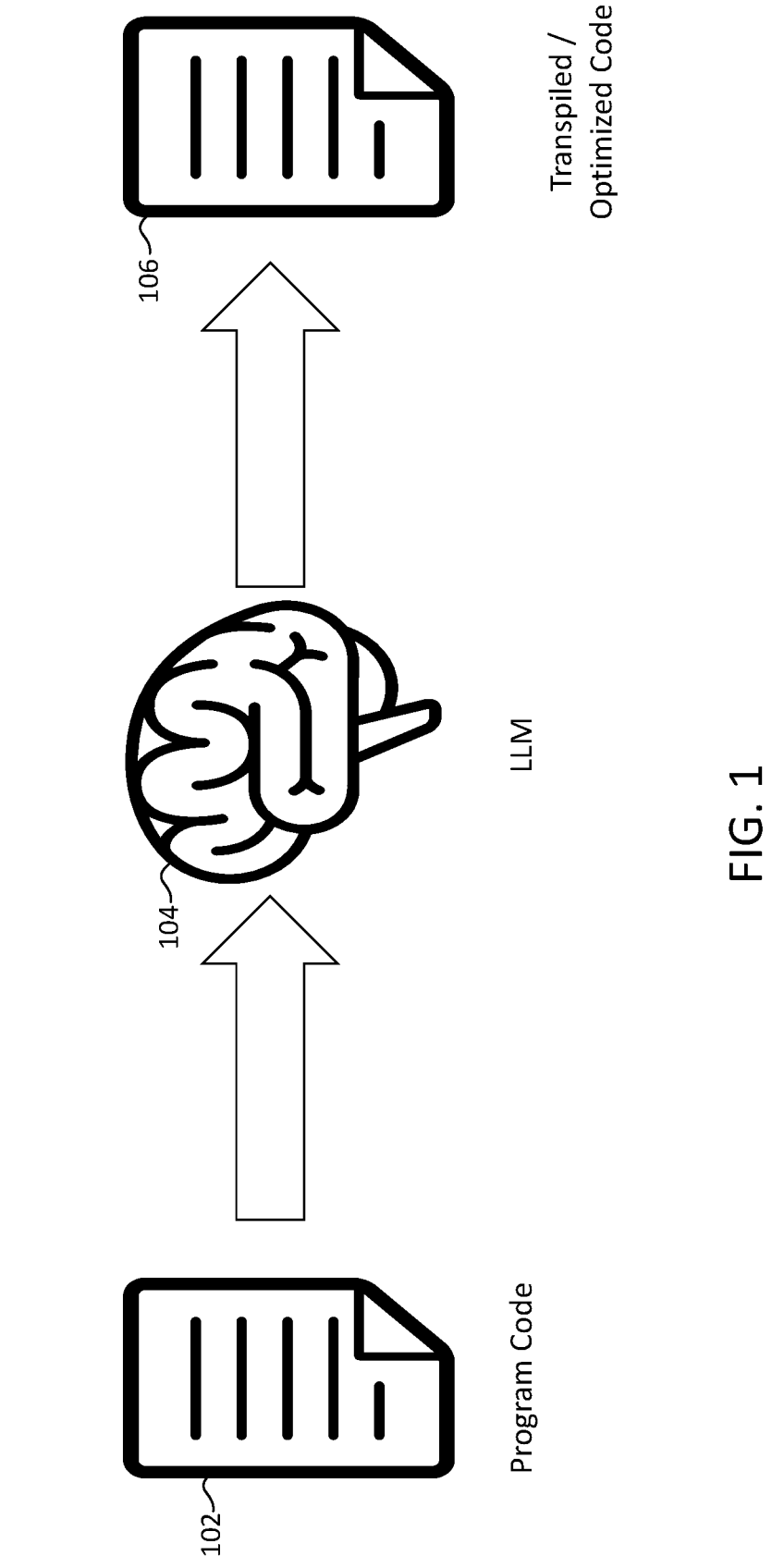
FIG. 1 illustrates an example of converting code through a black-box LLM.

Embodiments of the present invention provide an AI approach for automatically transforming old legacy code bases to modern codes to improve performance portability. Performance portability of legacy code is a huge technical problem for academia and industry. Especially in scientific computing, many legacy code bases still use Fortran. To use these codes on newer hardware or architectures, the legacy code often needs to be manually ported, or specialized compilers and code annotations need to be used. Embodiments of the present invention provide an AI method that enhances the computational abilities of an AI system to automatically transform old code bases to modern tensor computational codes, in particular, incorporating a Large Language Model (LLM) to assist the automatic transformation.

In the following, an example is provided to illustrate the technical challenges of transforming legacy code. Listing 1 below is example code written in C with nested loops, direct memory access patterns and compiler-specific code annotations for parallelization and vectorization. While the code is efficient, it is technically challenging to port in a non-manual fashion to other hardware platforms and cannot directly be scaled onto multiple devices.

```
typedef struct {
        int shape[2];
        float* data;
} Data2D;
Data2D A;
A.shape[0] = data.shape[0];
A.shape[1] = data.shape[1];
A.data = (float*)malloc(sizeof(float) * A.shape[0] * A.shape[1]);
#pragma omp parallel for
for (int i = 0; i < data.shape[0]; i++) {
        #pragma omp simd
        for (int n = 0; n < data.shape[1]; n++) {
                int idx = i * data.shape[1] + n;
                A[idx] = 1.0f/sqrt(data[idx]) * i;
        }
}
```

Listing 1: Legacy Code

When the code shown in Listing 1 gets manually translated by an unexperienced programmer (usually scientific domain experts are non-professional coders), this programmer might produce code as shown in Listing 2 below. It's a direct translation, where Data2D is identified to correspond to a Pytorch tensor, the initialization of the Data2D shape and allocation of memory corresponds to the generating function torch.zeros_like and the nested loop is plainly translated. Such code often also is the result of manual adaptation by data scientist PhD students, that focus more on the algorithm and don't have an understanding of the lower mechanisms, incorrectly expecting that the frameworks will fix issues with the manually-adapted code. Notably, the older the legacy code becomes, the less familiarity and technical understanding is available for manual adaptation of the code.

```
A = torch.zeros_like(data)
for i in range(data.shape[0]):
        A[i, :] = torch.rsqrt(data[i, :]) * i
```

Listing 2: Inefficient Pytorch Code Example

While the code in Listing 2 is mathematically correct, it's very computationally inefficient, especially for large values for data.shape[0], because it will issue a huge number of function calls, causing a tremendous overhead in terms of computational time and resources within the executing framework. The code in Listing 2 causes data.shape[0] to have many sliced read, RSqrt, multiplication and sliced store operations.

In contrast, Listing 3 below would represent a computationally efficient translation of the legacy code.

```
B = torch.rsqrt(data) * torch.arange(data.shape[0]).view (−1, 1)
```

Listing 3: Efficient Pytorch Code Example

In Listing 3, the code only generates one RSqrt, one multiplication and one Arrange operation. This small optimization can already result in >7× speedup on central processing units (CPUs) and >1200× on graphics processing units (GPUs), thereby resulting in significant increases in compute time and savings of computational resources. The difference is especially significant for GPUs, since Listing 2 causes thousands of times more GPU function calls, that all come with a specific launch overhead, that is accumulated, while Listing 3 can be executed with a maximum of three function calls. Optimizing compilers can even execute Listing 3 with a single function call.

Embodiments of the present invention overcome the above-described technical problems in adapting legacy code in an efficient manner using large language models (LLM), and provide for enhanced computer functionality of an LLM-based AI system to adapt the legacy code in an automated and computationally efficient manner as well. LLMs have already proven to be well-suited to be used for translating between different programming languages (transpilation) (see Pan, Rangeet, et al., "Understanding the Effectiveness of Large Language Models in Code Translation," arXiv:2308.03109 (August 2023); Jana, Prithwish, et al., "Attention, Compilation, and Solver-based Symbolic Analysis are All You Need," arXiv:2306.06755 (June 2023), hereinafter "Jana et al."; and Lachaux, Marie-Anne, et al., "Unsupervised Translation of Programming Languages," arXiv:2006.03511 (September 2020), hereinafter "Lachaux et al.", each of which is hereby incorporated by reference herein) or to optimize code performance within a specific programming language (see Madaan, Aman, et al., "Learning Performance-Improving Code Edits," arXiv:2301.07867 (February 2023), hereinafter "Madaan et al."; and Garg, Spandan, et al., "DeepPERF: A Deep Learning-Based Approach For Improving Software Performance," arXiv: 2206.13619 (June 2022), hereinafter "Garg et al.", each of which is hereby incorporated by reference herein).

In a first aspect, the present invention provides a computer-implemented, machine learning method for preprocessing code for performance portability. Performance critical code segments are extracted from an application, and input data is obtained. Ground truth data is generated based on the input data and the application. Original code of the application is transpiled using a large language model (LLM) into a tensor computation language (TCL) candidate. Correctness of an implementation of the TCL candidate is verified using the ground truth data.

In a second aspect, the present invention provides the method according to the first aspect, further comprising optimizing the TCL candidate using the LLM or another LLM.

In a third aspect, the present invention provides the method according to any of the first or second aspects, wherein optimizing the TCL candidate is performed using performance data from optimizing compiler systems or runtime systems.

In a fourth aspect, the present invention provides the method according to any of the first to third aspects, further comprising passing the TCL candidate through the optimizing compiler systems or runtime systems to generate heuristics and the performance data.

In a fifth aspect, the present invention provides the method according to any of the first to fourth aspects, wherein the heuristics and the performance data are used as feedback to update the LLM that is used for optimizing the TCL candidate.

In a sixth aspect, the present invention provides the method according to any of the first to fifth aspects, further comprising evaluating correctness of an implementation of the optimized TCL candidate, and accepting the implementation of the optimized TCL candidate based on a result of the implementation being correct and one or more user-provided constraints being met.

In a seventh aspect, the present invention provides the method according to any of the first to sixth aspects, further comprising repeating the steps of transpiling, verifying and optimizing based on a determination that an implementation of the optimized TCL candidate is not correct.

In an eighth aspect, the present invention provides the method according to any of the first to seventh aspects, wherein the performance critical code segments are identified using a trained LLM that weights performance criticality of code segments from the application.

In a ninth aspect, the present invention provides the method according to any of the first to eighth aspects, wherein the trained LLM is trained based on code examples and a target function that increases a score based on a mathematical transformation being used, or data in a vectorizable data structure being accessed.

In a tenth aspect, the present invention provides the method according to any of the first to ninth aspects, wherein obtaining the input data includes obtaining user provided input data and/or generating inferred or synthetically generated input data using automated checkpointing or static code analysis.

In an eleventh aspect, the present invention provides the method according to any of the first to tenth aspects, wherein extracting the performance critical code segments from the application includes automatically inferring data dtype, shape, and potential value ranges from code of the performance critical code segments.

In a twelfth aspect, the present invention provides the method according to any of the first to eleventh aspects, wherein automatically inferring the potential value ranges includes analyzing loop ranges, memory access patterns, static or templated data types, and/or mathematical operations.

In a thirteenth aspect, the present invention provides the method according to any of the first to twelfth aspects, further comprising using user provided input data and/or inferred or synthetically generated input data to automatically reject invalid or corrupted code segments.

In a fourteenth aspect, the present invention provides a computer system for preprocessing code comprising one or more processors, which, alone or in combination, are configured to perform a machine learning method for preprocessing code according to any of the first to thirteenth aspects.

In a fifteenth aspect, the present invention provides a tangible, non-transitory computer-readable medium for preprocessing code which, upon being executed be one or more hardware processors, provide for execution of a machine learning method according to any of the first to thirteenth aspects.

FIG. 1 shows an example how LLMs are used according to existing technology to translate program code as a black box to transpiled or optimized code. However, such a use of LLMs according to existing technology is not capable of solving the technical issues in adapting the legacy code, providing device and performance portability, and addressing inefficient procedural code problems. Especially in the field of optimizing tensor compilers, being able to generate a very high level description of the code can be key to leveraging optimal performance and providing for hardware independence. If non-experts write code, the compilers need to understand the intent of the user and to transform it into a format that is suited for it to apply all of its optimizing capabilities. So far this has been done by manually implementing heuristic-based transformations, which is very tedious and requires a significant amount of effort and resources. However, by adapting and using LLMs for this task, it can be automated and require less attention within the compiler development, to fix the mistakes of the user. LLMs are capable of doing these transformations automatically, as they get trained with thousands of code examples, and therefore combine the knowledge of thousands of good and bad programming cases and learn how to transform them. FIG. 1 depicts workflow 100 which begins with program code 102 that is input into an LLM 104 for generating transpiled/optimized code 106. However, as described herein conventional LLMs are not properly trained or utilize the correct data to generate optimized TCL candidates or extract critical code segments.

In a first step of the AI method according to an embodiment of the present invention, a LLM is used to identify and extract the performance critical code segments of an application. This is done because applications usually consist of multiple parts, program initialization, data loading, data (pre-) processing, storing of the output, etc. Not all of these parts are performance critical, and some can be optimized by software optimizations. For example, data loading/storing is usually bottlenecked by the peak throughput of the input/output (I/O) devices or the data format, and not the software. Further, the history memory of LLMs is limited and they cannot operate on too large of code bases, as the optimization scope would be too vast. For this first step, a LLM is trained based on code examples and a target function is used that weights the performance criticality of the code segments. As TCLs only aim for mathematical operations, the target function increases it's score whenever mathematical transformations are used, or data in vectorizable data structures is accessed. I/O related functions don't benefit from TCLs and therefore the score is set to zero. As nested loops or range operators such as '[x, :, 1:5]' increase the complexity of the algorithm, these increase the score equivalently. For example:

```
# O(A)
for a in range(A):
    . . .
# O(A^2)
for a in range(A):
    for b in range(A):
        . . .
```

This LLM is then trained to identify TCL compatible codes and can further rank them in importance given their algorithmic complexity.

Garg et al. implement what they refer to as "critical code segment extraction", but this is only done for assembler code, and is also not based on ML technology, but rather on rule/heuristic-based implementations. In contrast, embodiments of the present invention provide for extracting code segments in any language, including high level languages, using LLMs.

Next, the AI method according to an embodiment of the present invention provides for automatic verification data inference for verifying the optimizations that are needed to be able to run the application with example data. This data can either be user provided or inferred by an embodiment of the present invention. If the data is generated, it's impossible to guess real data, which however is not necessary if the application can be run with randomized data and is able to generate a ground truth result that can be used to verify the correctness of the optimized code according to an embodiment of the present invention. If the user provides input data, checkpoints can be added automatically at the beginning and end of the identified code segments that extract the input and output data that can later be used for verification.

For automatic generation, an embodiment of the present invention inspects the data structures used within the code. First, the data type of the data structures is determined. If a function signature with static function types is provided, the code can be inferred from them directly (e.g., 'void func (double*a, float*B, int*C)'). This also applies to templated types ('template<typename T>') as they need to be known at compile time and therefore are available as well. For languages without static function types (e.g., Python), an embodiment of the present invention traces their usage within the respective code segment and looks for clues, e.g., Python's div 'A/B' returns a float, while 'A//B' does integer division. Other clues include:

Python's 'C=A/B', A→any, B→any, C→float
Python's 'C=A//B', A→any, B→any, C→integer
Usage of constants, e.g., 'B=A*1.0', A→any, B→float
Mathematical functions, e.g., 'sqrt(A)', A→float
Lookups, e.g., 'array[indices[ . . . ]]', array→any, indices→integer As the examples show, it is possible to end up with numerous 'any' dtypes (data types). In that case, it is possible to infer them bottom up, so if in 'C=A/B', C is a float, A and B are any, then it can be assumed that A and B are also float. This is advantageous and possible because it is only needed to generate data that can be used to execute the code segment to generate a reproducible result. It is not necessary to do senseful computations.

Cui, Siwei, et al., "PYInfer: Deep Learning Semantic Type Inference for Python Variables," arXiv:2106.14316 (June 2021), which is hereby incorporated by reference herein, uses a GRU-based recurrent neural network (RNN) to infer data types in Python. This approach provided bad results (everything unknown is automatically a string, and variables suddenly change type from string to int without that an operation is executed on it), leading to the conclusion that finding the correct data type for scientific TCL-like codes is better to be done by static analysis.

In a second step, the AI method according to an embodiment of the present invention provides to infer the shape of the data (e.g., the shape of the Tensor that contains the data). This can be done by looking at the boundaries of the used loop indices in combination with the data access patterns. For example:

'array[A][B][C]'→3D tensor, with shape [A, B, C]
'array[a*B*C+b*C+c]'→3D tensor, with shape [A, B, C]
'array[((a*B)+b)*C+c]'→3D tensor, with shape [A, B, C]

First, the number of independent variables (==number of dimensions) are identified. Next, the sizes of each dimension are determined. For this, an embodiment of the present invention splits the dimensions into its components.

Use '((a*B)+b)*C+c+3'.
Solve first all brackets: 'a*B*C+b*C+c+3'.
Split the three independent variables (a, b, c) split these into three dimensions:
'a*B*C'
'b*C'
'c+3'
As 'c' is not multiplied, it's the innermost dimension. '+3' is a constant offset, so the size of dimension is at least 'C>3'.
'b' is multiplied with one constant, therefore it's the second dimension of size 'B'.
'a' is multiplied by 'B' and 'C' and therefore the third dimension with size 'A'.
This results in the shape [A, B, C], with C>3.

In a third step, the AI method according to an embodiment of the present invention provides, if needed, to limit the value ranges of the data. For lookups ('array [indices[ . . . ]]'), it is provided to further limit the value range of 'indices' to be between 0 and the maximum number of elements within 'array' to ensure that the process does not run out of the boundaries. Mathematical functions can be defined only for specific ranges, e.g. the inverse trigonometric function notated as "a sin" is only defined between [-1, 1]. Another case is 'x/math_func(y)' so it's invalid to choose any 'y' where 'math_func' returns 0.

In a fourth step, after the shape, dtype and value range of the data is inferred, the AI method according to an embodiment of the present invention randomly initializes this data and runs it through the code segment to generate the ground truth output data. Laukemann, Jan, "Cross-Architecture Automatic Critical Path Detection For In-Core Performance Analysis," Master Thesis, Friedrich-Alexander-Universität Erlangen-Nürnberg (January 2020), which is hereby incorporated by reference herein, uses existing test data to mutate/modify it using ML to generate new variants of the test data. In contrast, embodiments of the present invention provide to be able to infer the data types, shapes and value ranges to generate fully synthetic test data.

Figure 2:
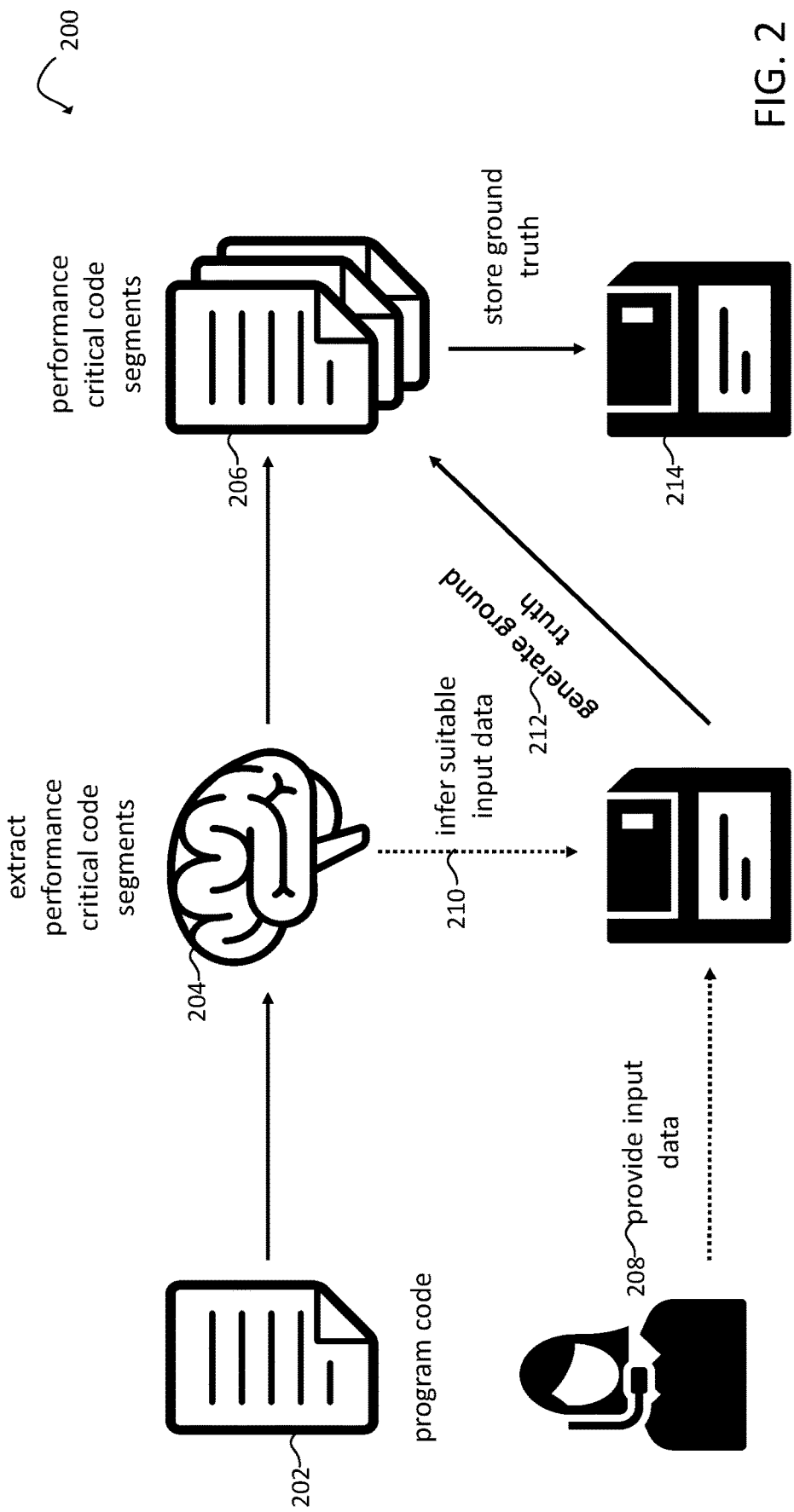
FIG. 2 schematically illustrates an AI method and system for the extraction of performance critical code segments, inference of suitable input data and generation of ground truth according to an embodiment of the present invention.

FIG. 2 schematically illustrates a workflow 200 of an AI method and system for the extraction of performance critical code segments, inference of suitable input data and generation of ground truth according to an embodiment of the present invention. In embodiments input data can be inferred or synthetically generated using automated checkpointing or via static code analysis. Static code analysis can include any suitable technique for automatically examining source code without executing a program associated with the source code. This can include analyzing the code against a set or multiple sets of coding rules. In workflow 200, program code or source code 202 is provided to an LLM to extract performance critical code segments 204 of an application to generate performance critical code segments 206. As described above, this is necessary as applications typically include multiple parts which are not all performance critical.

In embodiments, the LLM can be trained based on code examples and using a target function that weights the performance criticality of a given code segment from the program code 202. The LLM can be trained to identify TCL compatible codes and further rank them in importance given their algorithm complexity. Workflow 200 also includes a process for verifying optimizations which includes running the application with example data. In embodiments and as depicted in FIG. 2, the example data can be user provided 208 or inferred 210. If the example data is user provided 206, the workflow can include adding checkpoints automatically at the beginning and end of the identified code segments 204 that extract the input and output data that can be used later for verification. For inferring suitable data 210 the system may analyze data structures used within the code 202 to determine data types, infer the shape of the data, and limit the value ranges of the data as described above. Workflow 200 includes generating ground truth data 212 and storing the ground truth 214. If the input data is inferred 210 the data is randomly initialized and run through the performance critical code segments 206 to generate the ground truth 212.

Figure 3:
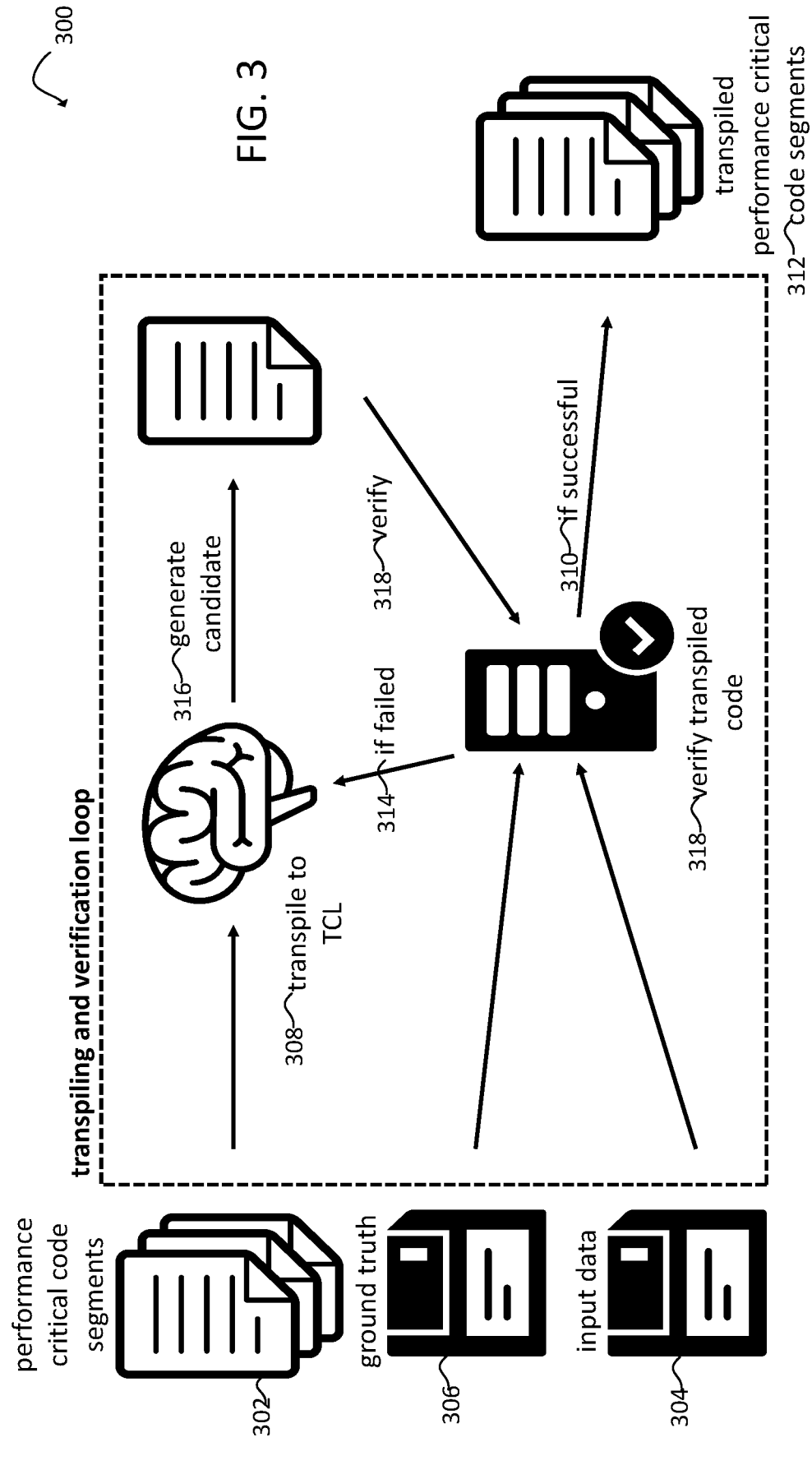
FIG. 3 schematically illustrates a transpiling and verification loop implementation according to an embodiment of the present invention.

FIG. 3 illustrates workflow 300 for an implementation for transpiling the legacy languages into an equivalent TCL using an LLM, and automatic verification. If the input code of the user is already a TCL, then this step can be skipped. For transpiling, an embodiment of the present invention uses the previously extracted critical code segments 302, transpiles them using a LLM into a TCL and verifies using the reference input 304 and ground truth data 306. As used herein, transpiling includes a process for taking source code written in one language and transforming it into another language. For example, taking source code of a program written in one programming language as input and transpiling the source code into an equivalent source code in a different programming language. If the transpilation 308 was successful 310, the result is stored 312, otherwise the process continues until a suitable candidate is found. The cause of the failure is provided as feedback 314 to the LLM (e.g., if it is a compilation/syntax error, or if it one or multiple outputs have been wrong). If the LLM is unable to generate any candidate, the LLM is prompted to provide a reason to the user why the transpilation has failed. This can happen if the used functionality is not available in the TCL (e.g., specialized rounding modes for floating point operations) or the code contains hacks such as pointer arithmetic tricks, integer under-/overflow or other hardware-specific tricks that the LLM is unable to understand. In contrast to Jana et al. and Lachaux et al., which use LLMs to transpile existing code to other languages and emphasize that the generated code is likely to be faulty, embodiments of the present invention provide for improved results and an automatic verification loop. As described herein, the system may generate TCL candidates 316 which are verified 318 using the ground truth 306 and/or input data 304.

Figure 4:
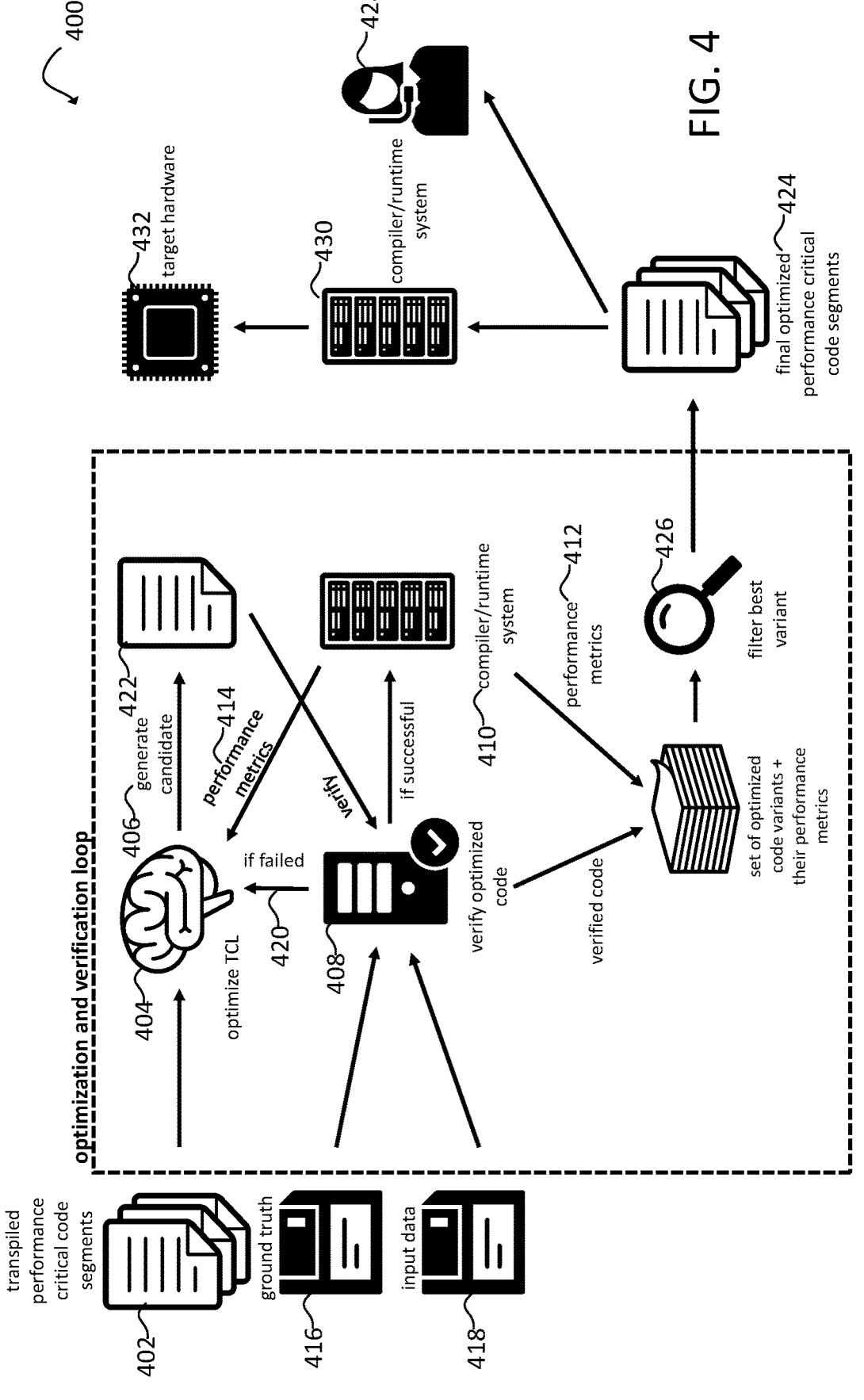
FIG. 4 schematically illustrates an optimization and verification loop implementation according to an embodiment of the present invention.

FIG. 4 illustrates workflow 400 for an implementation for optimization of TCL performance critical code segments 402, and automatic verification. Here, a LLM 404 is used to generate optimization candidates 406. After verification 408, the candidate(s) is passed through an optimizing compiler or runtime system 410 to get heuristics and measured performance relevant data 412 such as execution time and resource requirements such as loop counts, register count or memory consumption. This information is provided as feedback 414 into the LLM 404 to steer its code optimizations. For example, the feedback 414 could be that the compiler or runtime system 410 reports that more than available registers are needed. This can result in reduced performance through register spilling (data from registers will be stored in main memory, and reloaded when needed). This is slower than keeping data available in registers. With this information the LLM 404 may be able to change the code in a way that requires less registers. A pseudocode example includes:

```
#variant 1
```

```
for(...):
        A = ...
        I[...] = { }
        for(...):
                I[...] = input[...]
                A += funcA(I[...])
        for(...)
                B += funcB(I[...], A)
# variant 2
for(...):
        A = ...
        for(...):
                A += funcA(input[...])
        for(...)
                B += funcB(input[...], A)
```

Assuming in variant #1 'I[ . . . ]' is small enough to store it in registers, this variant will be faster because in the 2nd loop it is not needed to access main memory anymore. However, if the number of available registers is exceeded, then data is loaded from main memory in 1st loop, spill it back to main memory and read it again in 2nd loop. In contrast, the 2nd variant always reads from main memory, and does not have the spilling, just 2× reading, which therefore is more efficient.

In embodiments, the ground truth 416 and/or input data 418 is used to verify 408 the candidate. This is especially advantageous for accelerator hardware to not use too many registers and provide for optimal performance since register spilling can be very costly in terms of computational resources. As described herein, failed candidates or information about the failures 420 can be provided to the LLM 404 for updating the LLM 404 for subsequent iterations. In embodiments the ground truth 416 has an input and output portion. If a user provides the input portion then the system can run code to generate the output portion. If a user does not provide input then it can be generated as described above for automatically inferring suitable data. The inferred suitable data can be run as code to generate the output portion of the ground truth 416. For verification, the input portion, whether user provided or automatically inferred/generated, is ran through the optimized code. If the output of this process is not the same as the ground truth output then something is incorrect and the failed candidates or information about the failures 420 can be provided to the LLM 404 for updating the LLM 404 for subsequent iterations.

An example is data duplication as follows:

```
#inefficient, as data gets duplicated before transformation
A=apply_transformations(np.repeat(data, num_repeats))
#efficient, as data gets duplicated after transformation
A=np.repeat(apply_transformations(data), num_repeats))
```

In this example, data gets duplicated before applying a specific transformation. If the transformation is not correlated to the duplicated items, then the order can be changed, which is much more performant, as the transformations get applied once, and not 'num_repeats'-times. However, if the transformations apply different changes to each repeated item, then this is not possible. Here, two examples for uncorrelated and correlated transformations are:

```
def uncorrelated_transform(x):
        return x + 5
def correlated_transform(x):
        for i in range (x.shape[0]):
                x[i, :] = x[i, :] + i
        return x
```

Due to the verification process according to an embodiment of the present invention, invalid optimizations such as these can be identified and rejected. In case of uncorrelated transformation, the optimizing compiler according to an embodiment of the present invention would report larger memory consumption and larger loop counts for the 'repeat>transform'-case than for the 'transform>repeat'-case, which helps the LLM to understand which impact the optimization has on the code to further improve the implementation.

Overall, this process is repeated with verification and feeding performance-related metadata into the LLM until it converges to one or multiple best candidates 422. Then, the best variant 424 is selected depending on the user's requirements 426 (best performance, lowest memory consumption, best tradeoff of performance and memory consumption, lowest energy consumption, best hardware utilization . . . ) given the performance data from the optimizing compiler/runtime system according to an embodiment of the present invention. The best candidates 422 may be ranked and depending on the user's requirements 426 may be filtered accordingly. For example, if a user aims for lowest energy consumption, then the best candidates 422 would get ranked by this metric and then the best variant 424 is selected. This final optimized TCL 424 can then either be returned to the user 428 or can directly be passed to an optimizing compiler/runtime system 430 on the target hardware 432 for execution. In an embodiment, the optimized TCL 424 can be provided to the user 428 via a user interface. The user 428 can then run the optimized TCL 424 on their own system or hardware such as target hardware 432.

The transpilation and optimization process could also be done in a single LLM, but for better explainability, they are preferably implemented as two separated steps. For example, the LLM described in FIG. 3 may be trained for transpilation while the LLM described in FIG. 4 may be trained for optimization, which keeps the language but instead changes ordering of instructions, function calls, exchanges function calls, transforms loops, etc.

In contrast to Madaan et al. and Garg et al., which use LLMs to try to optimize code performance, embodiments of the present invention provide for improved results and an automated verification loop, and also provide to incorporate compiler/runtime generated performance metadata in the optimization process to steer the generation of improved optimizations.

In an exemplary embodiment, the AI method and system according to an embodiment of the present invention can be applied for legacy code translation and performance portability. For example, many companies and universities today still maintain decade old codes written in old languages such as Fortran that would require expert coders and significant resources to provide for optimal performance. Using LLMs according to an embodiment of the present invention, these languages can be translated to tensor arithmetic code that is not only much easier to maintain, but also can be efficiently mapped onto different hardware architectures and distributed onto multiple devices using state-of-the-art runtime systems without code changes. The AI method and system according to an embodiment of the present invention can be especially advantageously applied to High Performance Computing (HPC) applications, for example to provide improved HPC clusters to industry and universities. For universities, their infrastructure team is especially interested in running only peak performance code. However, often PHD students lack the time and experience to write efficient code, or even need to incorporate code that generations of previous PhD students have left over to them, so that today universities need to hire engineers whose only job is to optimize code of PhD students, so that it does not under-utilize the cluster. This phenomenon is described by Bischoff, Christian et al., "Brainware for green HPC," Computer Science—Research and Development 27(4):1-7 (August 2011), which is hereby incorporated by reference herein, which also gives estimations of how much engineering effort is needed. Embodiments of the present invention provide to automate this process with improved performance and results and huge savings of expert and computational resources, as well as application development costs.

In an exemplary embodiment, the AI method and system according to an embodiment of the present invention can be applied for translating code in an efficient manner so that it saves computational time, power and resources. As pointed out in the example code of Listing 2 and Listing 3, non-expert programmers tend to write code that works, but is not necessarily efficient for the hardware and software to execute. Using LLMs according to an embodiment of the present invention, inefficient or legacy code can be translated into mathematically equivalent code that can be much more easily mapped onto more efficient implementations. This embodiment can again be especially advantageously applied to HPC applications.

Embodiments of the present invention thus provide for general improvements to computers in machine learning systems to enable these computer systems to more efficiently translate code, also in an automated manner and with verification mechanisms. Moreover, embodiments of the present invention can also be applied to provide improved performance to other applications using AI or scientific computations in technical fields including, but not limited to, medical (e.g., digital medicine, personalized healthcare, AI-assisted drug or vaccine development, composition or material development, and smart cities (e.g., automated traffic or vehicle control, smart districts, smart buildings, smart industrial plants, smart agriculture, energy management, etc.). For example, by applying optimizations according to an embodiment of the present invention to an application in AI-assisted vaccine development, a speedup of over 20× speedup was achieved on the Numpy preprocessing pipeline used in the application. It took an experienced engineer over one week to do the optimizations. In contrast, the optimizations according to an embodiment of the present invention were applied within minutes, in an automated fashion without any engineer. Therefore, embodiments of the present invention allow to reduce the time of the development cycles without requiring any engineers to do the optimizations, which are at the same time reliable, computer-resource efficient and not prone to human errors.

In an embodiment, the present invention provides a method for automatically translating legacy or inefficient procedural code into tensor mathematical code, the method comprising:

1) Extracting performance critical code segments.

2) Generating synthetic or using user provided input data, either via automated checkpointing or static code analysis.

3) Generating a ground truth result using the original code/application. Example pseudocode may for generating the ground truth result using the original code/application may include

```
app=read_code( )
if user_provided_input:
--> input = user_provided_input
else:
-->input = infer input(app)
segments = split_into_segments(app)
ground_truth – dict( )
for segment in segments:
-->output = segment(input)
-->ground_truth[segment] = (input, output)
--> input = output.
```

The code may be split into segments and then the entire application may be ran using either user provided or inferred input data. For each segment it records the input and output, which then is the ground truth, which is used later to optimize each of the segments separately and verify them.

4) Transpiling the original code using an LLM into a TCL candidate.

5) Evaluating correctness of the candidate implementation.

6) Optimizing the TCL candidate using a LLM and performance data from optimizing compiler/runtime systems to fine-tune the candidate.

7) Evaluating correctness of candidate implementation. This step may also use the ground truth to verify correctness. Verification is performed in every iteration to ensure that the candidate has not corrupted or caused the application to fail.

8) Accepting candidate implementation if the result is correct and if the user provided constraints (e.g., execution time) that are fulfilled; otherwise, return to step 3) and repeat until one or multiple suitable implementations have been found.

Embodiments of the present invention provide for the following improvements and technical advantages over existing technology:

1) Extracting performance critical code segments from user code (either in legacy or TCL) to limit the search space of the transpiling and optimization using an LLM that was trained with a TCL specialized target function, that extracts computationally resource-intensive code segments by ranking their algorithmic complexity. The granularity of the extracted code segments is constrained by the capability of the downstream optimization pipeline. For example, the LLM may be fed with examples of code and then a target function uses heuristics or manual annotations to split compute intensive parts of an application. As an example in pseudo-code:

```
def function(...):
    for(...): # O(N^3)
        for(...):
            for(...):
    ...
    for(...): # O(N^2)
        for(...):
    ...
    ... # O(1) <-- irrelevant
        for(...): # O(N)
    ...
```

This pseudocode identifies how to split the compute intensive parts of the application and how to rank them. The TCL specific part is when parts of the code are hidden in specialized functions, e.g.:

```
def function( . . . ):
    gemm( . . . ) #O(N^3).
```

A target function is necessary that can tell the algorithm that this single function call is still expensive especially if it is used within a nested loop, such as:

```
def function(...):
    for(...): # O(N^4) and not O(N^3) because gemm(...)
    is more complex than the following
    2x nested loops:
    ...
        gemm(...)
        for(...):
            for(...):
    ...
```

2) Inferring suitable input data based on the critical code segments for automatic verification. If a user provides input, automatic checkpointing is applied before and after the code segments. The automatic checkpointing may be executed similar to generating the ground truth described above. If not, data type, shape and possible value ranges are automatically inferred from the code by analyzing loop ranges, memory access patterns, static or templated types, and mathematical operations.

Then, this input and output data is used in the consecutive transpiling and optimization steps to automatically reject invalid/corrupted code variants.

3) Utilizing compilers/runtime systems as a feedback loop to get measured or heuristic performance data to guide the LLM's optimization process and to filter out the best suited final implementation.

4) Enabling to automatically translate inefficient or legacy code to more efficient or newer code bases that are easier to maintain and can be efficiently used to be run in state-of-the-art runtime engines or as input for modern optimizing tensor compilers. Further, embodiments of the present invention enable to translate procedural code to mathematically identical tensor code that can be more efficiently executed or better optimized by tensor compilers.

Figure 5:
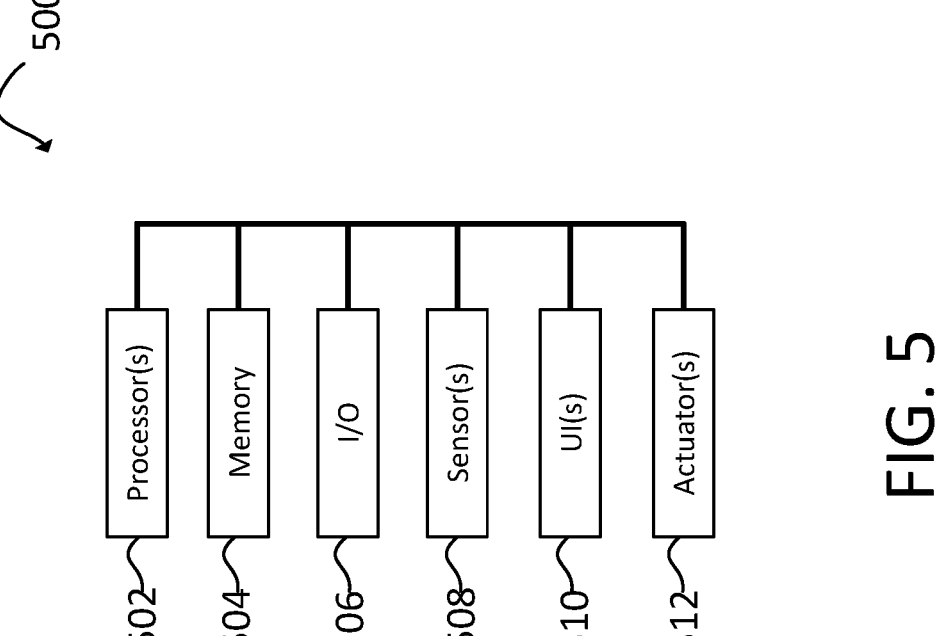
FIG. 5 is a block diagram of an exemplary processing system, which can be configured to perform any and all operations disclosed herein.

Referring to FIG. 5, a processing system 500 can include one or more processors 502, memory 504, one or more input/output devices 506, one or more sensors 508, one or more user interfaces 510, and one or more actuators 512. Processing system 500 can be representative of each computing system disclosed herein.

Processors 502 can include one or more distinct processors, each having one or more cores. Each of the distinct processors can have the same or different structure. Processors 502 can include one or more central processing units (CPUs), one or more graphics processing units (GPUs), circuitry (e.g., application specific integrated circuits (ASICs)), digital signal processors (DSPs), and the like. Processors 502 can be mounted to a common substrate or to multiple different substrates.

Processors 502 are configured to perform a certain function, method, or operation (e.g., are configured to provide for performance of a function, method, or operation) at least when one of the one or more of the distinct processors is capable of performing operations embodying the function, method, or operation. Processors 502 can perform operations embodying the function, method, or operation by, for example, executing code (e.g., interpreting scripts) stored on memory 504 and/or trafficking data through one or more ASICs. Processors 502, and thus processing system 500, can be configured to perform, automatically, any and all functions, methods, and operations disclosed herein. Therefore, processing system 500 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 500 can be configured to perform task "X". Processing system 500 is configured to perform a function, method, or operation at least when processors 502 are configured to do the same.

Memory 504 can include volatile memory, non-volatile memory, and any other medium capable of storing data. Each of the volatile memory, non-volatile memory, and any other type of memory can include multiple different memory devices, located at multiple distinct locations and each having a different structure. Memory 504 can include remotely hosted (e.g., cloud) storage.

Examples of memory 504 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 504.

Input-output devices 506 can include any component for trafficking data such as ports, antennas (i.e., transceivers), printed conductive paths, and the like. Input-output devices 506 can enable wired communication via USB®, Display-Port®, HDMI®, Ethernet, and the like. Input-output devices 506 can enable electronic, optical, magnetic, and holographic, communication with suitable memory 506. Input-output devices 506 can enable wireless communication via WiFi®, Bluetooth®, cellular (e.g., LTE®, CDMA®, GSM®, WiMax®, NFC®), GPS, and the like. Input-output devices 506 can include wired and/or wireless communication pathways.

Sensors 508 can capture physical measurements of environment and report the same to processors 502. User interface 510 can include displays, physical buttons, speakers, microphones, keyboards, and the like. Actuators 512 can enable processors 502 to control mechanical forces.

Processing system 500 can be distributed. For example, some components of processing system 500 can reside in a remote hosted network service (e.g., a cloud computing environment) while other components of processing system 500 can reside in a local computing system. Processing system 500 can have a modular design where certain modules include a plurality of the features/functions shown in FIG. 5. For example, I/O modules can include volatile memory and one or more processors. As another example, individual processor modules can include read-only-memory and/or local caches.

The following references are hereby incorporated by reference herein:

Paduraru, Ciprian, et al., "An Automatic Test Data Generation Tool using Machine Learning," In Proceedings of the 13th International Conference on Software Technologies (ICSOFT), pages 472-481, ISBN: 978-989-758-320-9 (2018).

Feldt, Robert, et al., "Towards Automated Boundary Value Testing with Program Derivatives and Search," arXiv: 1905.11198 (May 2019).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for preprocessing code for performance portability, the computer-implemented method comprising:
   extracting performance critical code segments from an application, wherein the performance critical code segments represent a portion of an original code of the application;
   obtaining input data;
   generating ground truth data based on the input data and the application;
   transpiling the performance critical code segments extracted from the original code of the application using a large language model (LLM) into a tensor computation language (TCL) candidate; and
   verifying correctness of an implementation of the TCL candidate using the ground truth data.

2. The computer-implemented method according to claim 1, further comprising optimizing the TCL candidate using the LLM or another LLM.

3. The computer-implemented method according to claim 2, wherein optimizing the TCL candidate is performed using performance data from optimizing compiler systems or runtime systems.

4. The computer-implemented method according to claim 3, further comprising passing the TCL candidate through the optimizing compiler systems or runtime systems to generate heuristics and the performance data.

5. The computer-implemented method according to claim 4, wherein the heuristics and the performance data are used as feedback to update the LLM that is used for optimizing the TCL candidate.

6. The computer-implemented method according to claim 2, further comprising evaluating correctness of an implementation of the optimized TCL candidate, and accepting the implementation of the optimized TCL candidate based on a result of the implementation being correct and one or more user-provided constraints being met.

7. The computer-implemented method according to claim 2, further comprising repeating the steps of transpiling, verifying and optimizing based on a determination that an implementation of the optimized TCL candidate is not correct.

8. The computer-implemented method according to claim 1, wherein the performance critical code segments are identified using a trained LLM that weights performance criticality of code segments from the application.

9. The computer-implemented method according to claim 8, wherein the trained LLM is trained based on code examples and a target function that increases a score based on a mathematical transformation being used, or data in a vectorizable data structure being accessed.

10. The computer-implemented method according to claim 1, wherein obtaining the input data includes obtaining user provided input data and/or generating inferred or synthetically generated input data using automated checkpointing or static code analysis.

11. The computer-implemented method according to claim 1, wherein extracting the performance critical code segments from the application includes automatically inferring data dtype, shape, and potential value ranges from code of the performance critical code segments.

12. The computer-implemented method according to claim 11, wherein automatically inferring the potential value ranges includes analyzing loop ranges, memory access patterns, static or templated data types, and/or mathematical operations.

13. The computer-implemented method according to claim 1, further comprising using user provided input data and/or inferred or synthetically generated input data to automatically reject invalid or corrupted code segments.

14. A computer system for preprocessing code for performance portability, the computer system comprising one or more hardware processors which, alone or in combination, are configured to provide for execution of the method according to claim 1.

15. A tangible, non-transitory computer-readable medium having instructions thereon which, upon being executed by one or more processors, provide for preprocessing code for performance portability by execution of the method according to claim 1.

16. A computer-implemented method for preprocessing code for performance portability, the computer-implemented method comprising:

extracting performance critical code segments from an application;

obtaining input data;

generating ground truth data based on the input data and the application;

transpiling original code of the application using a large language model (LLM) into a tensor computation language (TCL) candidate;

verifying correctness of an implementation of the TCL candidate using the ground truth data; and optimizing the TCL candidate using the LLM or another LLM, wherein optimizing the TCL candidate is performed using performance data from optimizing compiler systems or runtime systems.

17. The computer-implemented method according to claim 16, further comprising passing the TCL candidate through the optimizing compiler systems or runtime systems to generate heuristics and the performance data.

18. The computer-implemented method according to claim 17, wherein the heuristics and the performance data are used as feedback to update the LLM that is used for optimizing the TCL candidate.

19. A computer-implemented method for preprocessing code for performance portability, the computer-implemented method comprising:

extracting performance critical code segments from an application, wherein the performance critical code segments are identified using a trained LLM that weights performance criticality of code segments from the application;

obtaining input data;

generating ground truth data based on the input data and the application;

transpiling original code of the application using a large language model (LLM) into a tensor computation language (TCL) candidate; and verifying correctness of an implementation of the TCL candidate using the ground truth data.

20. The computer-implemented method according to claim 19, wherein the trained LLM is trained based on code examples and a target function that increases a score based on a mathematical transformation being used, or data in a vectorizable data structure being accessed.

* * * * *